United States Patent [19]

Kozuka et al.

[11] Patent Number: 4,886,136

[45] Date of Patent: Dec. 12, 1989

[54] MOTOR-DRIVEN TYPE POWER ASSISTED STEERING CONTROL APPARATUS

[75] Inventors: Hajime Kozuka, Okazaki; Naoki Saito, Maebashi; Mitsuharu Morishita; Shinichi Kohge, both of Himeji, all of Japan

[73] Assignees: Mitsubishi Denki Kabushiki Kaisha; Nippon Seiko Kabushiki Kaisha, both of Tokyo, Japan

[21] Appl. No.: 136,757

[22] Filed: Dec. 22, 1987

[30] Foreign Application Priority Data

Dec. 26, 1986 [JP] Japan .................. 61-313213

[51] Int. Cl.$^4$ ............................................. B62D 5/04
[52] U.S. Cl. .................................................. 180/79.1
[58] Field of Search ...................... 180/79.1, 133, 141, 180/142, 143

[56] References Cited

U.S. PATENT DOCUMENTS

| | | | |
|---|---|---|---|
| 4,476,529 | 10/1984 | Nakamura et al. | 180/142 X |
| 4,530,413 | 7/1985 | Buike . | |
| 4,556,116 | 12/1985 | O'Neil | 180/79.1 |
| 4,580,648 | 4/1986 | Murakami et al. . | |
| 4,724,711 | 2/1988 | Sakakibara et al. | 180/79.1 X |
| 4,724,917 | 2/1988 | Naito et al. | 180/133 X |

FOREIGN PATENT DOCUMENTS

| | | |
|---|---|---|
| 0174137 | 3/1986 | European Pat. Off. . |
| 2502570 | 10/1982 | France . |
| 61-69367 | 7/1986 | Japan ............... 180/79.1 |
| 62-29467 | 2/1987 | Japan ............... 180/79.1 |
| 2164906 | 4/1986 | United Kingdom ............... 180/79.1 |

OTHER PUBLICATIONS

Patent Abstracts of Japan, vol. 10, No. 62, Mar. 12, 1986.
Patent Abstracts of Japan, vol. 8, No. 32, Feb. 10, 1984.

Primary Examiner—Mitchell J. Hill
Attorney, Agent, or Firm—Oblon, Spivak, McClelland, Maier & Neustadt

[57] ABSTRACT

A motor-driven type power assisted steering control apparatus has a torque sensor which is provided with first and second displacement-electric signal converting units and a control unit which is adapted to break a motor current and to interrupt application of a voltage to an electromagnetic clutch as soon as abnormality in the torque sensor is detected on the basis of the electric signals of the first and second displacement-electric signal converting units.

5 Claims, 6 Drawing Sheets

MOTOR-DRIVEN TYPE POWER ASSISTED STEERING CONTROL APPARATUS

BACKGROUND OF THE INVENTION

The present invention relates to a motor-driven type power assisted steering control apparatus for an automobile in which an auxiliary torque is applied to a steering mechanism by a rotating force from a motor.

A motor-driven type power assisted steering control apparatus of this kind is so constructed that an auxiliary torque is exerted to the steering shaft or the rack of an automobile by means of a transmission device such as a gear or a belt through a gear box by utilizing a driving force given by a motor.

In such control apparatus in which the auxiliary load is exerted in correspondence to a torque of steering, however, there is a drawback that a steering wheel is turned irrespective of non-operation of the steering wheel when a torque sensor is broken down.

SUMMARY OF THE INVENTION

It is an object of the present invention to provide a motor-driven type power assisted steering control apparatus which prohibits self-turning of the steering wheel when the torque sensor is broken down and which improves reliability on cruising of an automobile without substantial increase of manufacturing cost by only slight modification of a control program.

The foregoing and the other objects of the present invention have been attained by providing a motor-driven type power assisted steering control apparatus which comprises:
a speed sensor for detecting car speed;
a torque sensor comprising a torque-displacement converting unit which is disposed on a steering shaft to convert a torque of steering into an amount of displacement of the shaft; at least one displacement conveying unit which mechanically transmits the amount of displacement of the torque-displacement converting unit; and first and second displacement-electric signal converting units for converting the amount of displacement given by the displacement conveying unit into electric signals;
a d.c. motor for imparting an auxiliary torque to the steering shaft or a rack;
an electromagnetic clutch which is, on one hand, directly connected to the output shaft of the d.c. motor and is, on the other hand, connected to the steering shaft or the rack; and
a control unit adapted in such a manner that electric output signals are received from the speed sensor and the first and second displacement-electric signal converting units; judgment is made on the electric output signals from the first and second displacement-electric signal converting units as to whether or not difference between the values of the electric output signals is higher than a predetermined value; and when the difference in value is higher than the predetermined value, the d.c. motor and the electromagnetic clutch are deenergized based on the judgment that the torque sensor is abnormal, whereby the auxiliary torque is released from the steering shaft.

DETAILED DESCRIPTION OF THE PREFERRED EMBODIMENTS

In the following, preferred embodiments of the motor-driven type power assisted steering control apparatus of the present invention will be described with reference to the drawings.

Figure 1:
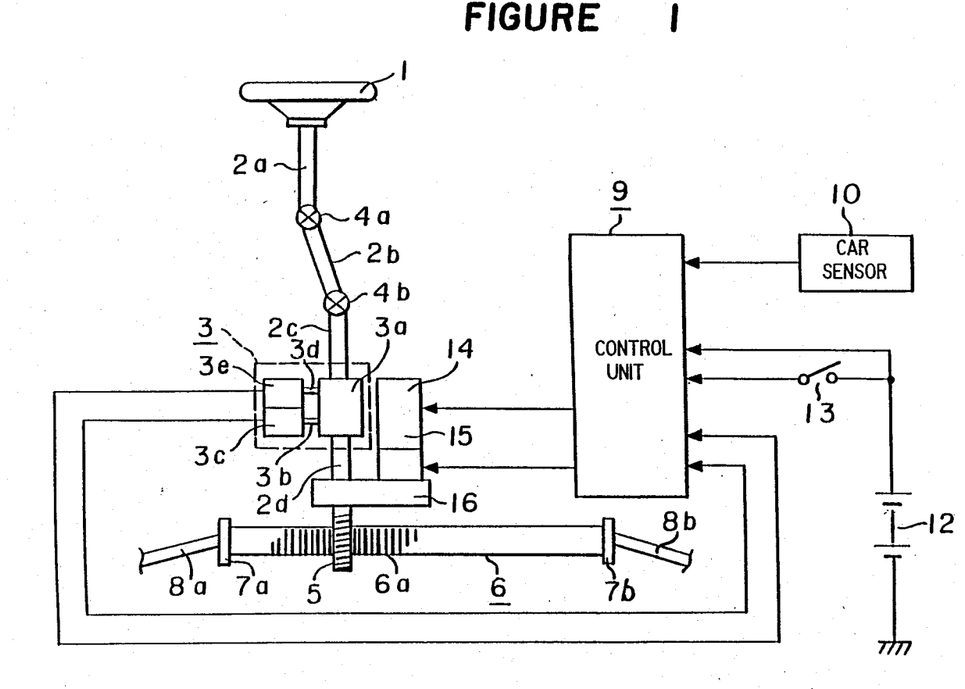
FIG. 1 is a block diagram of an embodiment of the motor-driven type power assisted steering control apparatus according to the present invention.

FIG. 1 is a block diagram showing the construction of an embodiment of the control apparatus. In FIG. 1, a reference numeral 1 designates a steering wheel by which a torque of steering is exerted to a steering system. The steering wheel 1 is connected to a first universal joint 4a through a first steering shaft 2a. The first universal joint 4a is connected to a second universal joint 4b through a second steering shaft 2b, and the second universal joint 4b is communicated with a torque sensor 3 through a third steering shaft 2c.

The torque sensor 3 comprises a torque-displacement converting unit 3a which converts a rotating force exerted to the steering wheel 1 into an amount of displacement, first and second displacement conveying units 3b and 3d which respectively transmit in mechanical manner the amount of displacement of the torque-displacement converting unit, and first and second displacement-electric signal converting units 3c and 3e which are respectively driven by the first and second displacement conveying units to convert the amount of displacement into electric signals.

A fourth steering shaft 2d connects the torque sensor 3 with a reduction gear 16 to which a pinion shaft 5 is connected. The pinion shaft 5 is interlocked with the rack teeth 6a of a rack 6. The both ends of the rack 6 are respectively connected to tie rods 8a, 8b through ball joints 7a, 7b.

The negative terminal of a battery 12 is grounded and the positive terminal is, on one hand, directly connected to a control unit 9 and is, on the other hand, connected to the control unit 9 through a key switch 13.

The control unit 9 is adapted to receive an output from a speed sensor 10 for detecting car speed, an output from the first displacement-electric signal converting unit 3c and an output from the second displacement-electric signal converting unit 3e. The control unit 9 is also adapted to control a d.c. motor 14 having a shuntwound coil or a shunt magnetic field, and an electromagnetic clutch 15.

The d.c. motor 14 is driven by the battery 12 through the control unit 9, and the electromagnetic clutch 15 serves to make or break mechanical engagement between the d.c. motor 14 and the reduction gear 16 in accordance with instruction from the control unit 9. The reduction gear 16 is inserted between the electromagnetic clutch 15 and the pinion shaft 5.

Figure 2:
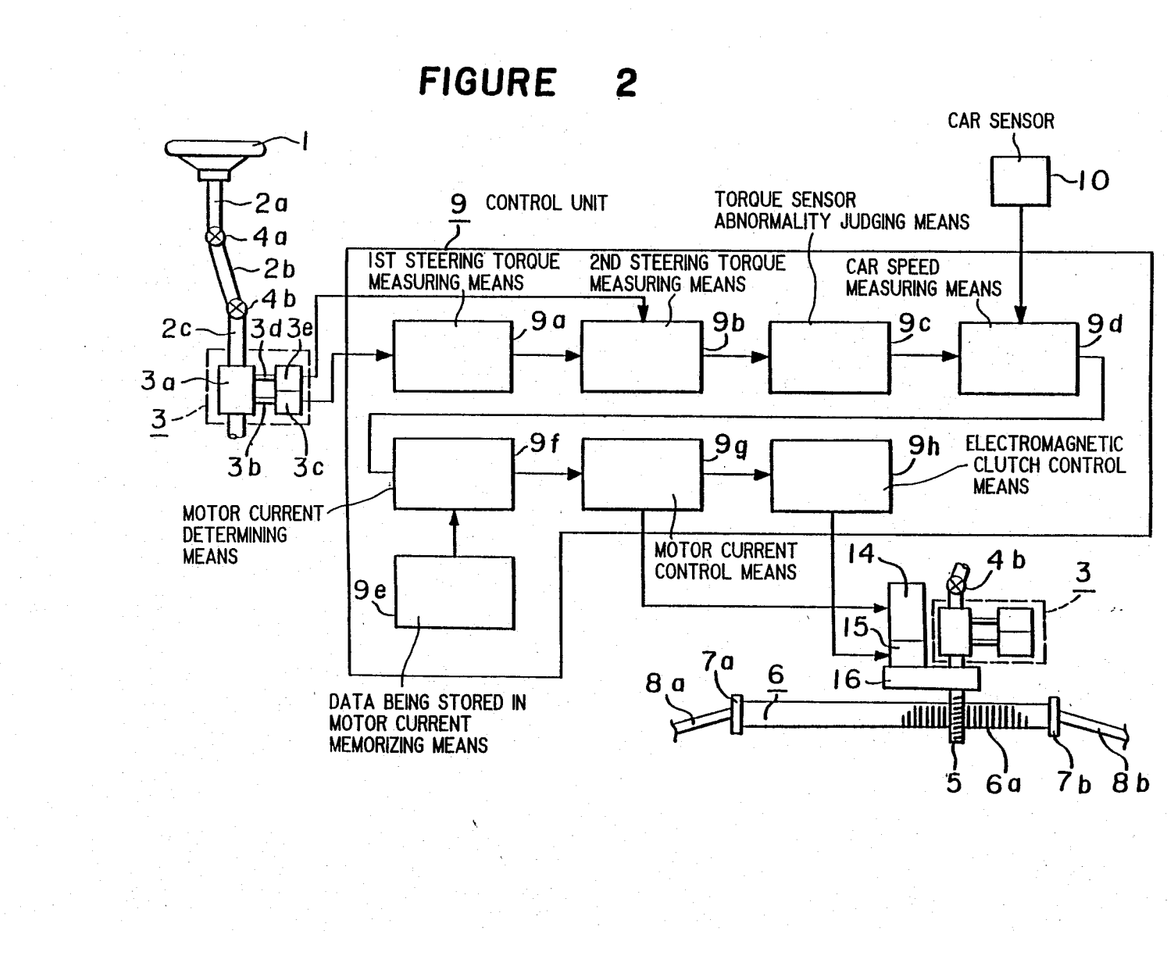
FIG. 2 is a block diagram of an embodiment of a control unit used for the control apparatus of the present invention.

FIG. 2 is a block diagram showing an embodiment of the control unit 9 used for the first embodiment shown in FIG. 1.

In FIG. 2, a reference numeral 9a designates a first steering torque measuring means for measuring a torque of steering on the basis of an electric output signal from the first displacement-electric signal converting unit 3c. A numeral 9b designates a second steering torque measuring means for measuring a torque of steering on the basis of an electric output signal from the second displacement-electric signal converting unit 3e.

A torque sensor abnormality judging means 9c is adapted to determine abnormality in the torque sensor 3 when an absolute value obtained by subtracting the value measured by the first steering torque measuring means 9a from the value by the second steering torque measuring means 9b is higher than a predetermined value.

The first steering torque measuring means 9a, the second steering torque measuring means 9b, the torque sensor abnormality judging means 9c, a car speed measuring means 9d for measuring car speed, a motor current determining means 9f, a motor current control means 9g and an electromagnetic clutch control means 9h are connected in series in this order. The car speed measuring means 9d is adapted to receive an output from a speed sensor 10.

The motor current determining means 9f is adapted to determine a desirable motor current from among the data of motor currents which are given on the basis of the torque of steering and the car speed, the data being stored in a motor current memorizing means 9e, and renders the motor current to be zero when the output of the torque sensor abnormality judging means 9c indicates an abnormal state of the torque sensor.

The motor current control means 9g controls a current flowing in the d.c. motor 14 on the basis of an output from the motor current determining means 9f. The electromagnetic clutch control means 9h controls the operation of the electromagnetic clutch 15 in such a manner that engagement and disengagement of the clutch 15 is controlled depending on both of a condition given by at least the car speed and a condition of the output of the torque sensor abnormality judging means 9c.

Figure 3:
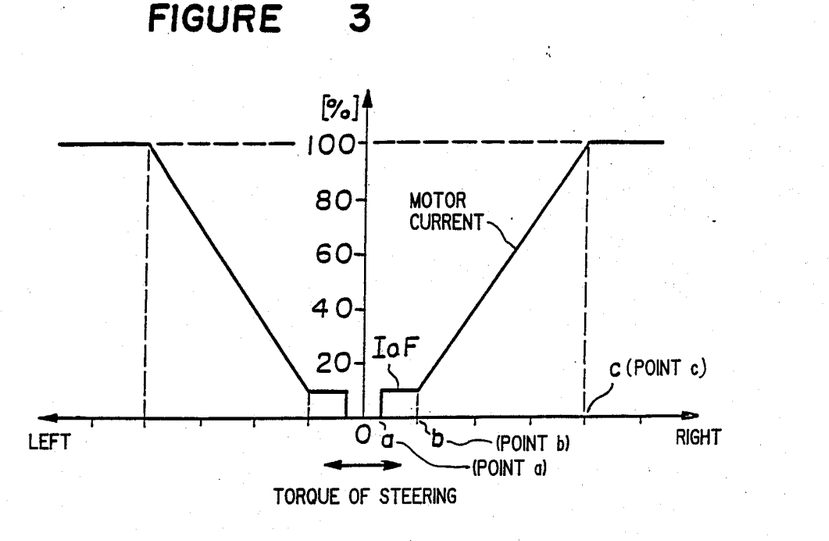
FIG. 3 is a characteristic diagram showing a relation of a torque of steering to a motor current to illustrate the operation of the above-mentioned embodiment.
Figure 4:
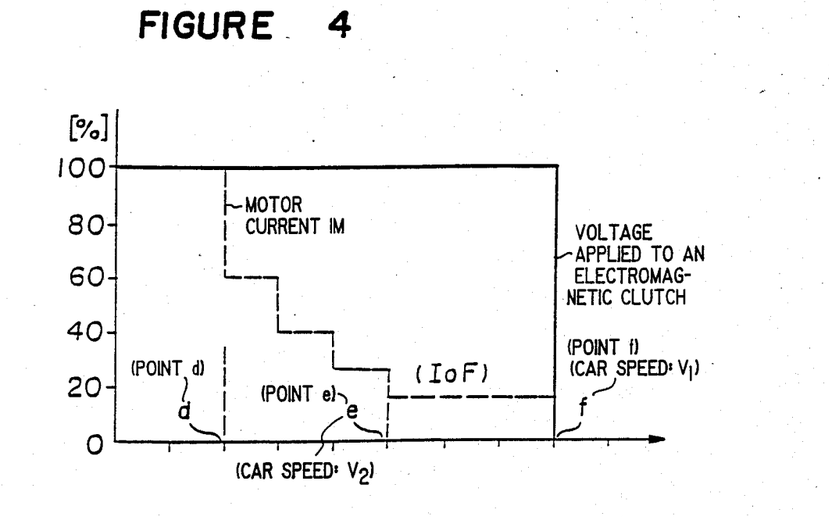
FIG. 4 is a characteristic diagram showing a relation of car speed to the motor current and a voltage applied to an electromagnetic clutch to illustrate the operation of the above-mentioned embodiment.

The operation of the above-mentioned embodiment will be described with reference to FIGS. 3 to 5. FIG. 3 is a characteristic diagram showing control of a motor current to a torque of steering; FIG. 4 is a characteristic diagram showing control of a motor current and a voltage applied to the electromagnetic clutch to car speed; and FIG. 5 is a flow chart showing a control program for the control unit 9.

Figure 5:
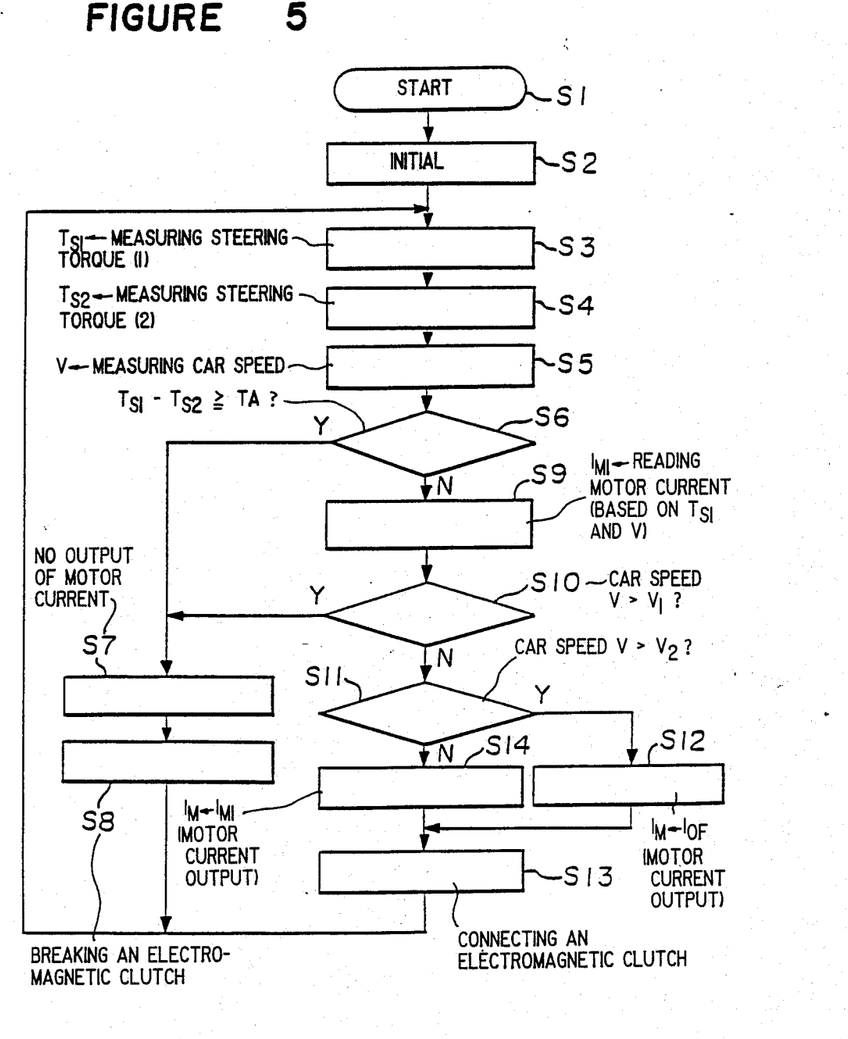
FIG. 5 is a flow chart on a control program for the above-mentioned embodiment.

In FIG. 5, when the key switch 13 is turned on to start the engine at Step S1, condition for operation is ready. Namely, the electromagnetic clutch 15 is activated so that the d.c. motor 14 is mechanically connected to the reduction gear 16.

The operation of the control apparatus of the present invention under the condition that the automobile is parking and the d.c. motor 14 is connected to the reduction gear 16 will be described. When a rotating force is given to the steering wheel 1 by a driver, a current flowing in the d.c. motor 14 is controlled by the control unit 9 as shown in FIG. 3.

When the torque of steering is increased on the right hand in FIG. 3, the d.c. motor 14 is turned on at a point a so that a current $I_{OF}$ (such as about 2 amperes–10 amperes) flows in the motor 14 in order to reduce influence of inertia of the d.c. motor 14 and the mechanical system of the apparatus.

When the torque of steering is further increased, the current flowing in the motor is also linearly increased from a point b, and finally the motor current becomes a 100% current at a point c. On the other hand, when the torque is decreased, the motor current is decreased from the point c, and it assumes the current $I_{OF}$ at the point b. When the torque is further decreased to the point a, the d.c. motor 14 is turned off. The operation as described above is applicable when the torque is exerted on the left hand in FIG. 3.

The torque of steering is in proportion to the motor current. Accordingly, when the torque is increased in FIG. 3, the d.c. motor 14 is on at the point a to feed the motor current $I_{OF}$. Since the current in the d.c. motor is gradually increased as the torque is increased, the output of the d.c. motor to the reduction gear 16 is also gradually increased, i.e. a torque to the reduction gear 16 is gradually increased. As a result, an auxiliary torque which is in correspondence to a force applied to the steering wheel 1 by the driver is transmitted to the rack teeth 6a through the electromagnetic clutch 15, the reduction gear 16 and the pinion shaft 5; thus, the operation of turning the steering wheel 1 is smoothly carried out.

In the following, the operation of the control apparatus when the automobile runs will be described. During cruising of the automobile, control of the motor current is conducted as shown in FIG. 4, in which a current $I_{M1}$ is fed to the motor 14. The current value corresponding to the $I_{M1}$ is stored in a motor current memorizing means 9e on the basis of the data of the torque of steering and the car speed.

A way to control the motor current will be described with reference to FIG. 5.

At Step 3, the first steering torque measuring means 9a receives an output signal from the first displacement-electric signal converting unit 3c to measure a steering torque TS1. On the other hand, at Step 4, the second steering torque measuring means 9b receives an output signal from the second displacement-electric signal converting unit 3e to measure a steering torque TS2. Further, a car speed measuring means 9d measures a car speed V on the basis of an output signal from the car sensor 10 at Step 5. Then, at Step S6, judgment is made as to whether or not $|TS1-TS2| \geq TA$ (TA is a reference for judging abnormality in the torque sensor) at the torque sensor abnormality judging means 9c. If $|TS1-TS2| \geq TA$ is not established, the motor current determining means 9f determines non-abnormality and takes the value of motor current $I_{M1}$ from the motor current memorizing means 9e at Step S9. The motor current $I_{M1}$ assumes a value depending only on the torque of steering until reaching the point d.

When the car speed exceeds the point d, the motor current takes a value obtained by multiplying a reduction factor (which is determined depending on the car speed V) by a value corresponding to the steering torque (which is determined by TS1 and TS2). When the car speed exceeds a point e (the car speed is a speed V2 which reduces assistance, i.e. necessity of the auxiliary torque), comparison of the car speed is made as to whether or not $V>V1$ (V1: a car speed for breaking the assistance) at Step S10. If it is not the case, comparison of the car speed is made as to whether or not $V>V2$ (V2: a car speed for reducing the assistance) at Step S11. If $V>V2$, the value of motor current is made constant (i.e. the current $I_{OF}$) by the motor current control means 9g at Step S12. At the same time, the electromagnetic clutch 15 is actuated by the electromagnetic clutch control means 9h at Step S13. If the relation of $V>V2$ is not established at Step S11, the motor current $I_{M1}$ is changed to a value $I_M$ at Step S14 and after which the electromagnetic clutch 15 is actuated in the same manner as Step S13.

At Step S10, when the car speed reaches the point f (car speed: V1), the motor current determining means 9f determines the motor current to be fed into the d.c. motor 14 at Step S7; namely, the motor current to the d.c. motor 14 is rendered to be zero by the motor current control means 9g. Then, the electromagnetic clutch control means 9h makes a voltage to be applied to the electromagnetic clutch 15 zero at Step S8.

Thus, the motor current and the voltage to the electromagnetic clutch become zero so that the d.c. motor 14 is mechanically separated from the reduction gear 16. As a result, the driver can operate the steering wheel 1 without assistance of the auxiliary torque given by the d.c. motor.

Figure 6:
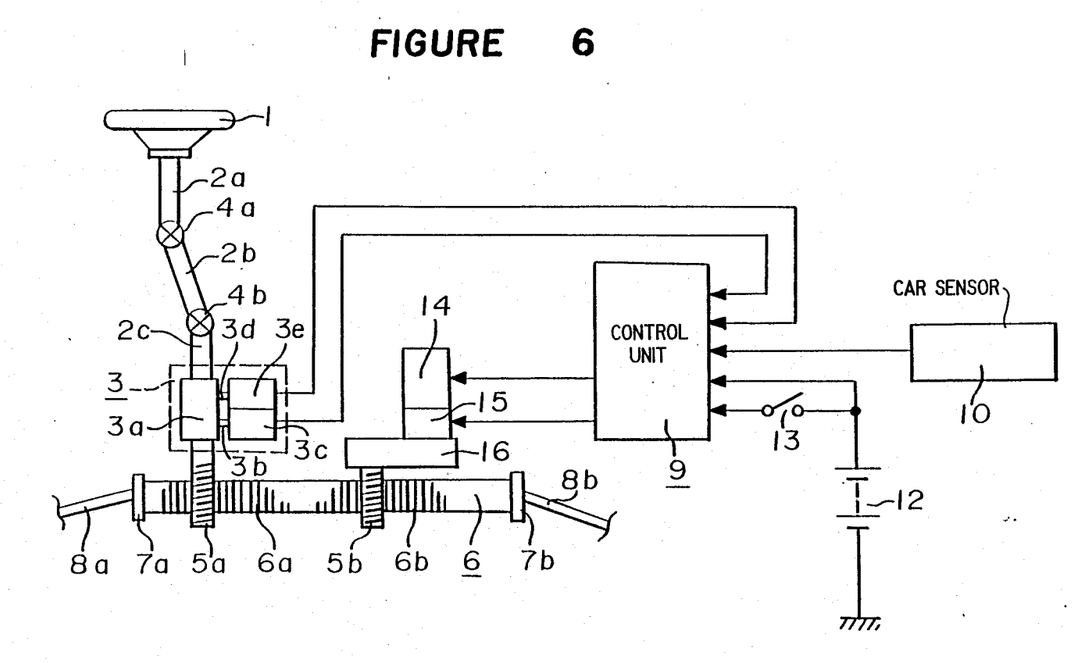
FIG. 6 is a block diagram of another embodiment of the motor-driven type power assisted steering control apparatus according to the present invention.

FIG. 6 shows another embodiment of the motor-driven type power assisted steering apparatus.

The embodiment shown in FIG. 6 has the same construction as that in FIG. 1 provided that an output from the electromagnetic clutch 15 is connected to the rack 6 through the reduction gear 16. In FIG. 6, a reference numeral 5a designates a first pinion formed on the fourth steering shaft 2d; a numeral 5b designates a second pinion formed on a shaft extending from the reduction gear 16; a numeral 6a designates a first rack teeth formed on the rack 6 to interlock with the first pinion 5a; and a numeral 6b designates a second rack teeth formed on the rack 6 to interlock with the second pinion 5b.

Figure 7:
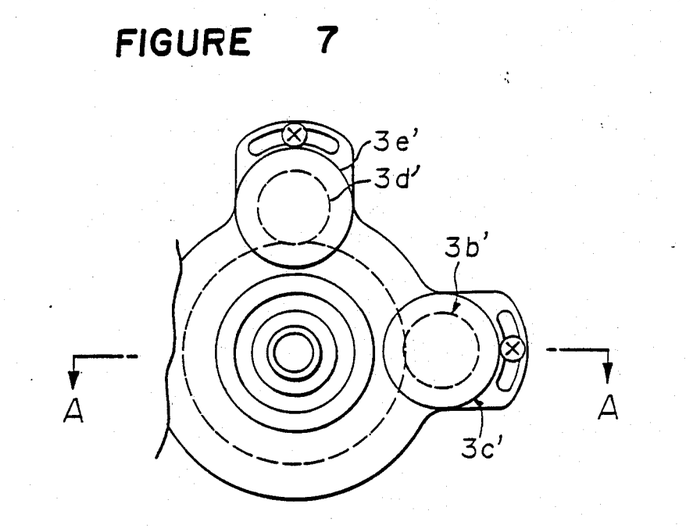
FIG. 7 is a plan view partly broken of an embodiment of the torque sensor used for the present invention.
Figure 8:
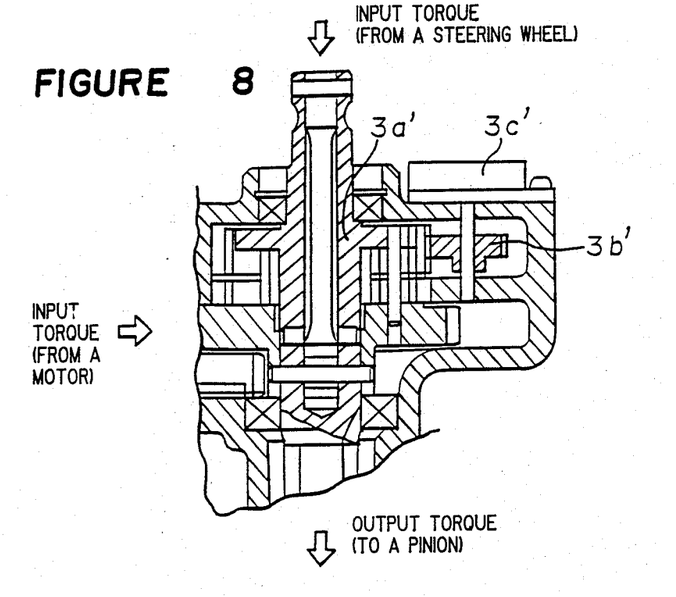
FIG. 8 is a cross-sectional view taken along a line A—A in FIG. 7.

FIGS. 7 and 8 are respectively a plan view and a cross-sectional view showing an embodiment of the torque sensor 3 in more detail. In FIGS. 7 and 8, reference numerals 3a', 3b', 3c', 3d' and 3e' respectively designate the portions corresponding to the numerals 3a, 3b, 3c, 3d and 3e in FIG. 1.

As described before, in the conventional control apparatus, the steering wheel 1 is self-turned when the torque sensor 3 is broken down. However, in the present invention provided with the torque sensor 3 in which there are the first and second displacement-electric signal converting units 3c, 3e, there is no possibility of causing a dangerous condition. Namely, the electric signals from the both converting units are received in the control unit 9 in which the both signals are calculated, and abnormality in the torque sensor is determined only when a value obtained by subtraction of the electric signal values is higher than a predetermined value (such as 0.1 kg.m or higher).

In more detail, when the relation of $|TS1-TS2| \geq TA$ is established (where TA is a reference value indicating abnormality in the torque sensor and the reference value in the absolute value between TS1 and TS2 is the same or higher than a predetermined value such as 0.1 kg.m), the torque sensor abnormality judging means 9c provides judgment of abnormality.

When the judgment of abnormality is provided, the motor current control means 9g stops feeding the motor current to the d.c. motor 14 by the instruction of the motor current determining means 9f. Simultaneously, the electromagnetic clutch control means 9h makes the voltage applied to the electromagnetic clutch 15 to be zero so that any auxiliary load is not applied to the steering shaft.

Thus, in the present invention, the first and second displacement-electric signal converting units are installed in the torque sensor to employ a double detecting system for the steering torque, and abnormality in the torque sensor is detected by slight modification of a control program for the control unit, whereby the motor current and the voltage to the electromagnetic clutch are interrupted. Accordingly, there is no possibility to cause the self-turning of the steering wheel. Further, the control apparatus of the present invention can be easily attained by changing the control program without causing substantial increase of manufacturing cost, and can provide high reliability and security.

We claim:

1. A motor-driven type power assisted steering control apparatus in a steering system having a rack which comprises:

a speed sensor for detecting car speed;

a torque sensor comprising torque-displacement converting means disposed on a steering shaft for converting a torque of steering into an amount of displacement of said torque-displacement converting means, at least one displacement conveying means for mechanically transmitting the amount of displacement of said torque-displacement converting means, and first and second displacement-electric signal converting means for converting the amount of displacement given by said displacement conveying means into electric signals;

a d.c. motor;

an electromagnetic clutch directly connected to the output shaft of said d.c. motor and operatively connected to said rack; and control unit having means for receiving electric output signals from said speed sensor and said first and second displacement-electric signal converting means, means for judging whether a difference in value between the electric output signals from said first and second displacement-electric signal converting means is higher than a predetermined signal value, and means for deenergizing said d.c. motor and said electromagnetic clutch based on the judgment that said torque sensor is abnormal, when said difference in value is higher than said predetermined value, whereby an auxiliary torque of said d.c. motor is disconnected from said steering shaft.

2. The motor-driven type power assisted steering control apparatus according to claim 1, wherein said torque sensor comprises first and second ones of said displacement conveying means which respectively convey a mechanical force from said torque-displacement converting means to said first and second displacement-electric signal converting means.

3. The motor-driven type power assisted steering control apparatus according to claim 1, wherein said control unit comprises first and second steering torque measuring means which receive electric signals from said first and second displacement-electric signal converting means to compare the values of the electric signals, and a torque-sensor-abnormality judging means for determining abnormality in said torque sensor based on a value obtained by subtraction of the values of said electric signals.

4. The motor-driven type power assisted steering control apparatus according to claim 1, wherein said control unit is provided with a motor current determining means and a motor current memorizing means, in which said motor current determining means comprises means for determining a desirable motor current on the basis of steering torque and car speed from among motor currents stored in said motor current memorizing means, and for rendering the motor current to be zero when an abnormality is detected in said torque sensor.

5. The motor-driven type power assisted steering control apparatus according to claim 4, wherein said control unit is provided with a motor current control means electrically connected to said d.c. motor to control a current to said d.c. motor on the basis of an output from said motor current determining means.

* * * * *